United States Patent [19]
Funabiki et al.

[11] Patent Number: 5,200,384
[45] Date of Patent: * Apr. 6, 1993

[54] EXHAUST GAS-PURIFYING CATALYST EXCELLENT IN HEAT RESISTANCE AND PROCESS FOR PREPARATION THEREOF

[75] Inventors: Masaki Funabiki, Mishima; Kunihide Kayano; Teiji Yamada, both of Numazu, all of Japan

[73] Assignee: N.E Chemcat Corporation, Tokyo, Japan

[*] Notice: The portion of the term of this patent subsequent to Sep. 15, 2009 has been disclaimed.

[21] Appl. No.: 635,519
[22] PCT Filed: Jun. 8, 1990
[86] PCT No.: PCT/JP90/00753
  § 371 Date: Feb. 11, 1991
  § 102(e) Date: Feb. 11, 1991
[87] PCT Pub. No.: WO90/14888
  PCT Pub. Date: Dec. 13, 1990

[30] Foreign Application Priority Data
  Jun. 9, 1989 [JP] Japan .................... 1-145491

[51] Int. Cl.$^5$ .................. B01J 21/04; B01J 23/10; B01J 23/56; B01J 37/03
[52] U.S. Cl. .................. 502/304; 423/213.5
[58] Field of Search .................. 502/304; 423/213.5

[56] References Cited

U.S. PATENT DOCUMENTS

| | | | |
|---|---|---|---|
| 4,316,822 | 2/1982 | Fujitani et al. | 502/304 |
| 4,367,162 | 1/1983 | Fujitani et al. | 502/304 X |
| 4,504,598 | 3/1985 | Ono et al. | 423/213.5 X |
| 4,727,052 | 2/1988 | Wan et al. | 502/304 X |
| 4,806,519 | 2/1989 | Chiba et al. | 502/304 X |
| 4,927,799 | 5/1990 | Matsumoto et al. | 502/304 X |
| 4,931,419 | 6/1990 | Blanchard et al. | 502/304 |
| 4,965,243 | 10/1990 | Kamada et al. | 502/304 |
| 5,015,617 | 5/1991 | Ohata et al. | 502/304 |

FOREIGN PATENT DOCUMENTS

| | | |
|---|---|---|
| 0595655 | 4/1990 | Australia . |
| 59-156434 | 9/1984 | Japan . |
| 222539 | 10/1986 | Japan . |

Primary Examiner—W. J. Shine
Assistant Examiner—Douglas J. McGinty
Attorney, Agent, or Firm—Wenderoth, Lind & Ponack

[57] ABSTRACT

This invention relates to a purifying-catalyst for exhaust gas emitted from internal combustion engines such as automobiles, and the object is to provide a catalyst which exhibits excellent exhaust gas purification performance at lower temperature compared to usual catalysts, even after high temperature aging, and a process for preparation thereof.

This object has been attained by an exhaust gas-purifying catalyst containing on a support having a monolithic structure as catalytic components at least one element of the platinum group, activated alumina, cerium, a coprecipitated ceria-stabilized zirconia oxide and optionally a zirconium compound, and a process for preparation of the above exhaust gas-purifying catalyst which comprises (a) preparing activated alumina containing at least one element of the platinum group,
(b) preparing a slurry containing this prepared platinum group element-containing activated alumina, cerium oxide, the coprecipitated ceria-stabilized zirconia and optionally the zirconium compound, and
(c) coating the slurry onto the support having a monolithic structure and calcining it.

16 Claims, 3 Drawing Sheets

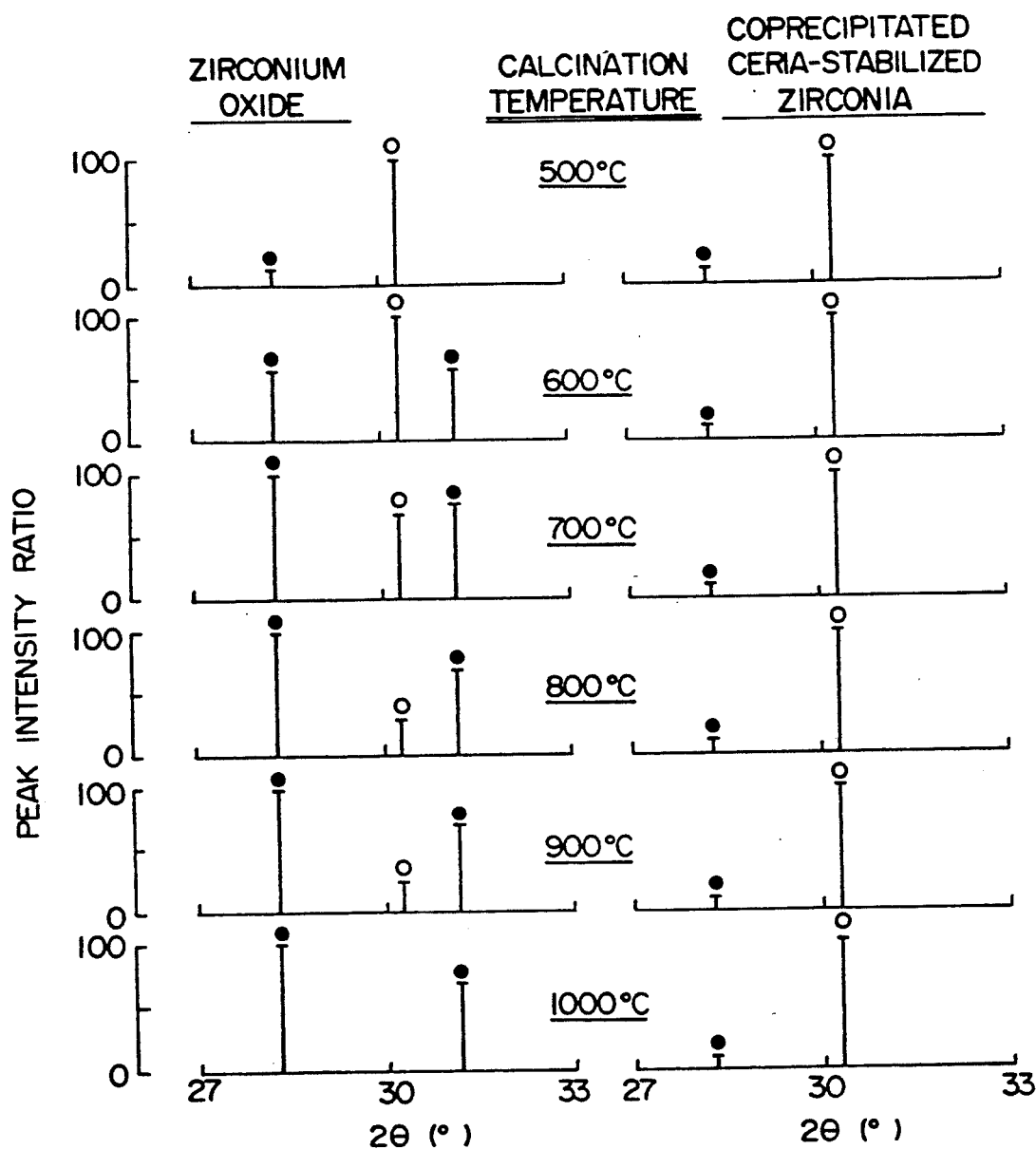
FIG. 1  CHANGE IN CRYSTALLINE STRUCTURE BETWEEN ZIRCONIUM OXIDE AND THE COPRECIPITATED CERIA-STABILIZED ZIRCONIA BY THE X-RAY DIFFRACTION METHOD
○ METASTABLE TETRAGONAL SYSTEM
● MONOCLINIC SYSTEM

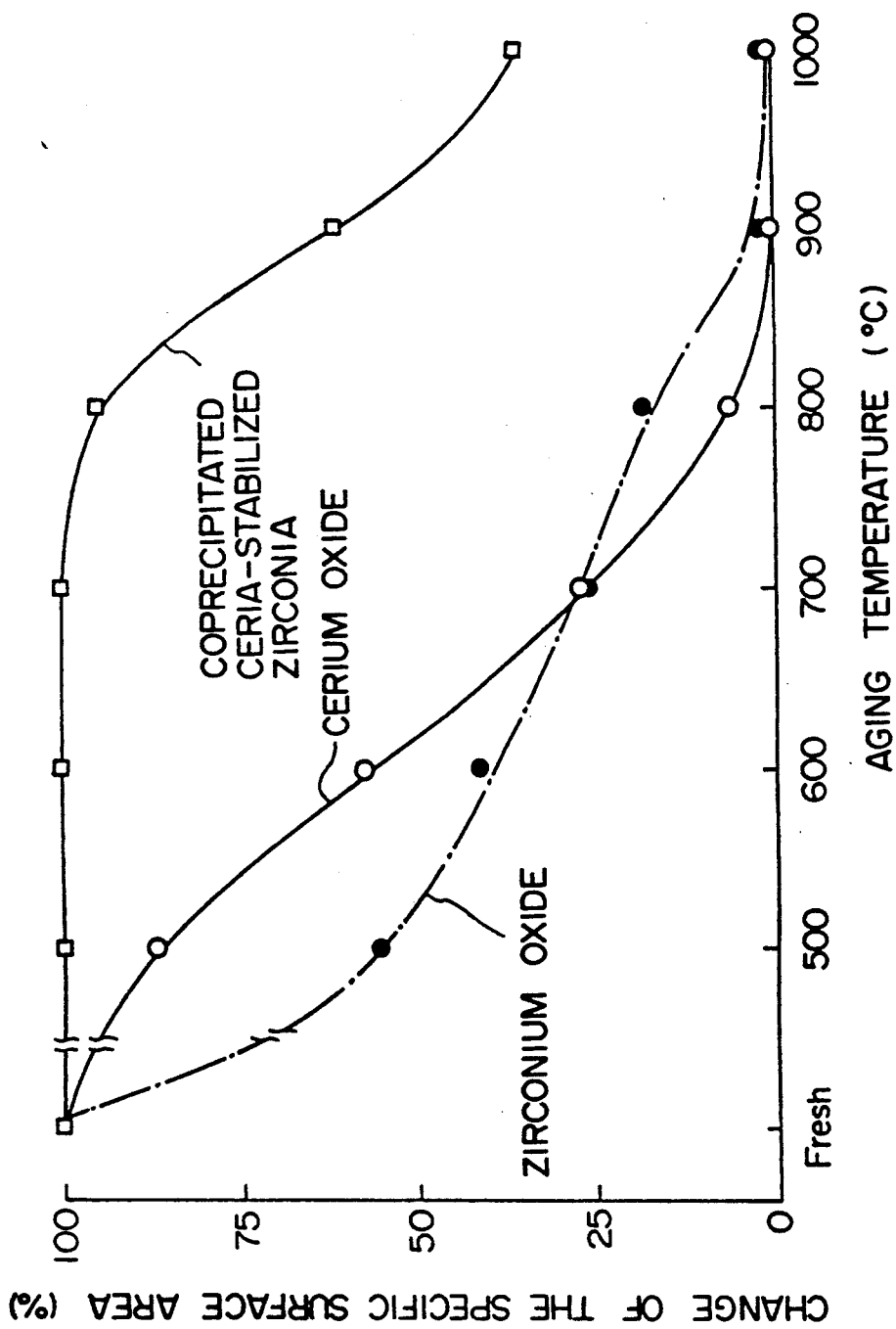
FIG. 2 CHANGE OF THE SPECIFIC SURFACE AREA OF THE COPRECIPITATED CERIA-STABILIZED ZIRCONIA AS A FUNCTION OF AGING TEMPERATURE AGING TIME: 4 HRS IN AIR IN AN ELECTRIC FURNACE

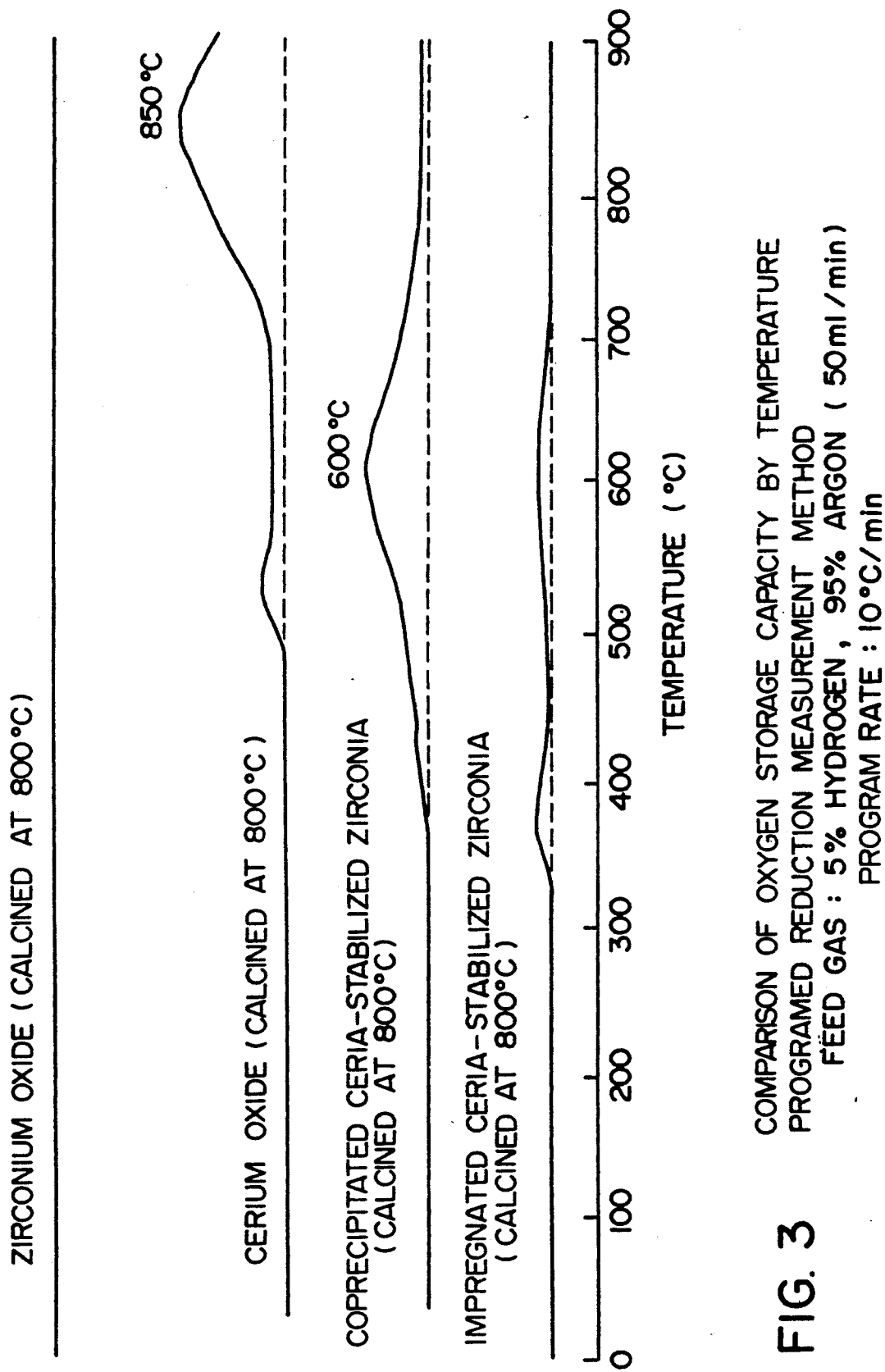
FIG. 3 COMPARISON OF OXYGEN STORAGE CAPACITY BY TEMPERATURE PROGRAMED REDUCTION MEASUREMENT METHOD
FEED GAS : 5% HYDROGEN, 95% ARGON (50ml/min)
PROGRAM RATE : 10°C/min

EXHAUST GAS-PURIFYING CATALYST EXCELLENT IN HEAT RESISTANCE AND PROCESS FOR PREPARATION THEREOF

TECHNICAL FIELD

This invention relates to purifying catalysts for exhaust gas emitted from internal combustion engines such as automobiles and a process for preparation thereof. More particularly, this invention relates to catalysts which exhibit excellent exhaust gas purification performance at lower temperature compared to usual catalysts and a process for preparation thereof.

BACKGROUND ART

Elements of the platinum group such as platinum and rhodium, and cerium oxide having an oxygen storage effect for enhancement of their activity at low temperature are mainly used now as catalytic converters to simultaneously remove hydrocarbons (HC), carbon monoxide (CO) and nitrogen oxides (NOx) in exhaust gas exhausted from internal combustion engines such as automobiles.

However, it is said that in catalysts containing an element of the platinum group and cerium oxide the oxygen storage function of cerium oxide strikingly lowers at a high temperature exposure above 800° C. and thus the catalysts are liable to deteriorate at those temperatures. Thus, many methods have been disclosed comprising adding oxides of alkaline earth elements, or zirconium compounds for the purpose of inhibiting crystallization of cerium oxide and preeserving its oxygen storage effect (for example, Japanese Laid-Open Patent Publication Nos. 58347/1989 and 116741/1988).

Further, in the latest catalytic converter, catalysts having a two or more-layer structure and containing rhodium in the outer layer are becoming conventional and permit effective utilization of expensive rhodium. It is known in these catalysts that it is effective to add zirconium oxide for prevention of lowering of the catalytic performance due to interaction of rhodium with alumina. Further, in these catalysts, it is considered that the catalytic performance is enhanced by an interaction between rhodium and zirconium oxide (for example, Japanese Laid-Open Patent Publication Nos. 222,539/1986 and 88,040/1988).

However, when zirconium oxide is exposed to high temperatures, its crystalline structure changes from the metastable tetragonal system having a catalytic activity to the inactive monoclinic system, contribution of rhodium and zirconium oxide to catalytic performance due to their an interaction diminishes, and the catalytic performance is lowered. At present there is no known catalyst to stabilize zirconium oxide in the catalyst and preserve the an interaction between rhodium and zirconium oxide.

DISCLOSURE OF INVENTION

An object of this invention is to develop a catalyst which solves the above problems in the prior art and exhibits an excellent exhaust gas purification performance at lower temperature even after high temperature aging.

As a result of vigorous study for a solution to the above problems, the present inventors found that it is extremely effective for enhancement of the activity of exhaust gas-purifying catalysts at low temperature after high temperature aging, to combine a coprecipitated ceria-stabilized zirconia (cerium oxide-stabilized zirconium oxides prepared by the coprecipitation method) having a specific oxygen storage performance as well as heat resistance with a conventional catalyst containing at least one element of the platinum group, activated alumina, cerium oxide and optionally a zirconium compound.

This invention is described below in detail.

In the invention, addition of a coprecipitated ceria-stabilized zirconia gave a desirable result for enhancement of the activity at low temperature after high temperature aging.

As shown in FIG. 1, the structure of zirconium oxide changes from the metastable tetragonal system to the monoclinic system as the temperature becomes higher, whereas a coprecipitated ceria stabilized zirconia prepared by the coprecipitation method preserves the structure of the metastable tetragonal system having a catalytic activity even after high temperature exposure.

Further, as shown in FIG. 2, this ceria-stabilized zirconium coprecipitated oxide has a small decrease ratio of the specific surface area and has a heat resistance such that the oxide has a surface area of 30 $m^2/cm^3$ or more even after 900° C. aging.

FIG. 3 compares the peak positions of active oxygen species (oxygen storage ability) of a coprecipitated ceria-stabilized zirconia, a ceria-stabilized zirconium impregnated oxide, cerium oxide and zirconium oxide respectively after calcining at 800° C. determined by the temperature programed reduction (TPR) measurement method. As shown in FIG. 3, the coprecipitated ceria-stabilized zirconia, i.e. cerium oxide-stabilized zirconium oxide prepared by the coprecipitation method exhibits an oxygen storage ability utterly different from those of the impregnated ceria-stabilized zirconia, i.e. cerium oxide-stabilized zirconium oxide prepared by the impregnation method, to say nothing of cerium oxide and zirconium oxide. The catalyst of the invention was completed by combination of both the stabilized zirconium having a specific oxygen storage ability and cerium oxide hitherto being known and having an oxygen storage ability.

[A] First, the catalyst of the invention will be described.

The exhaust gas-purifying catalyst of the invention is an exhaust gas-purifying catalyst containing at least one element of the platinum group, activated alumina, cerium oxide and a coprecipitated ceria-stabilized zirconia, and optionally a zirconium compound as catalyst components on a support having monolithic structure.

As the support having a monolithic structure there can be used a support composed of a heat-resistant base metal oxide or a heat-resistant base metal. Its shape can be a honeycomb shape or a foamed product having a three dimensional network structure.

Examples of the heat-resistant base metal oxides include cordierite, mullite, α-alumina, sillimanite, magnesium silicate, zircon, pentarite, spodumene, aluminosilicates, etc. Further, examples of the heat-resistant metals include heat-resistant iron-base alloys, heat-resistant nickel-base alloys, heat-resistant chromium-base alloys, etc.

Most preferably used among these supports having a monolithic structure are honeycomb supports composed of cordierite.

It is desirable that platinum and rhodium are contained as the elements of the platinum group for the purpose of simultaneous purification of CO, HC and NOx. The weight of platinum is not limited so long as necessary catalytic activity can be obtained, but usually 0.1 to 10 g, preferably 0.1 to 3 g per liter of the catalyst. Further, the weight of rhodium is not limited so long as the necessary catalytic activity can be obtained, but usually 0.02 to 2 g, preferably 0.02 to 0.7 g per liter of the catalyst.

The activated alumina is preferably, for example γ-alumina, its specific surface area is desirably 10 to 300 $m^2g$, and its weight is usually 30 to 200 g, preferably 40 to 120 g per liter of the catalyst.

The cerium oxide has a specific surface area of 10 to 300 $m^2/g$ and its weight is usually 10 to 150 g, preferably 10 to 50 g per liter of the catalyst.

The zirconium compound is preferably zirconium oxide or zirconyl hydroxide, and its weight is 0.1 to 30 g, preferably 1 to 25 g in terms of zirconium oxide per liter of the catalyst.

The coprecipitated ceria-stabilized zirconia is prepared by the coprecipitation method.

The coprecipitated ceria-stabilized zirconia has a specific surface area of 10 to 150 $m^2/g$, preferably 50 to 80 $m^2/g$ and its weight is usually 1 to 100 g, preferably 5 to 50 g per liter of the catalyst.

The weight ratio of cerium oxide to zirconium oxide both composing the coprecipitated ceria-stabilized zirconia is 1/99 to 25/75, preferably 5/95 to 15/85.

Preparation of a Coprecipitated Ceria-Stabilized Zirconia

A water soluble zirconium salt, e.g. zirconyl nitrate and a water soluble cerium salt, e.g. cerium nitrate are simultaneously or separately dissolved. The water soluble zirconium salt and the water soluble cerium salt can be used in a predetermined amount ratio depending on the desired weight ratio of cerium oxide to zirconium oxide in the cerium-stabilized zirconium coprecipitation oxide to be obtained. To the thus formed aqueous solution of the water soluble zirconium salt and the water soluble cerium salt there can be added an 1 to 10% by weight, preferably 2 to 7% by weight aqueous alkali solution, preferably aqueous ammonia solution at a temperature of 0° to 80° C., preferably 10° to 40° C., if necessary under increased pressure or reduced pressure, with sufficient stirring of the aqueous solution and preferably gradually to adjust the pH of the aqueous solution to 6 to 10, preferably 7 to 9, whereby a precipitate can be formed.

It is preferred that, after formation of the precipitate, the suspension is further stirred for 10 minutes to 10 hours, preferably 20 minutes to 3 hours and then left to stand for 1 to 100 hours, preferably 5 to 20 hours to age the precipitate.

This precipitate can be subjected, after suction filtration, to washing with deionized water and suction filtration repeated 2 to 10 times, preferably 3 to 5 times to give the cake of the precipitate.

This cake can be dried at a temperature of 50° to 200° C., preferably 70° to 150° C. and then calcined at a temperature of 600° to 900° C., preferably 700° to 850° C. for 30 minutes to 10 hours, preferably 1 to 5 hours to give coprecipitated a ceria-stabilized zirconia.

Preparation of Platinum Group Element-Containing Activated Alumina

Activated alumina (e.g. γ-alumina) is charged in a mixer. It is desirable that the particle size of this activated alumina is 1 to 100 microns (μ), preferably 1 to 50μ, more preferably 1 to 30μ. It is also possible to admix in the activated alumina part of cerium oxide and/or the coprecipitated ceria-stabililzed zirconia.

To this activated alumina, for example, preferably a platinum compound (e.g., hexahydroxoplatinic acid, chloroplatinic acid). The platinum compound can be added portionwise or at a time to γ-alumina with stirring. The platinum compound can be added as a solution (e.g., an aqueous solution) or a suspension (e.g., an aqueous suspension). The weight of the platinum compound to be added may be 1 to 100 g in terms of platinum per kg of the activated alumina and 100 to 500 ml as a solution of the platinum compound.

Then, for example, preferably a rhodium compound (e.g., rhodium nitrate, rhodium chloride) can be added to the mixture containing activated alumina and the platinum compound either portionwise or at once. The rhodium compound can be added as a solution or suspension. The weight of the rhodium compound to be added may be 0.2 to 50 g in terms of rhodium per kg of the activated alumina and 100 to 500 ml as a solution of the rhodium compound.

Then, an acetic acid solution, preferably 10 to 40% acetic acid solution is added to the mixture containing the platinum compound and activated alumina. It is preferred that the acetic acid solution is added portionwise to the mixture while it is stirred with a mixer. The amount of acetic acid to be added can be 100 to 300 ml per kg of the activated alumina.

Preparation of Slurry

The platinum group element-containing activated alumina obtained by the above process, cerium oxide, a coprecipitated ceria-stabilized zirconia, acetic acid and deionized water, and optionally a zirconium compound are charged in a mill and ground to form a slurry. The weight of cerium oxide is 50 to 500 g, preferably 150 to 400 g per kg of the activated alumina.

Preferred examples of the zirconium compound are zirconyl acetate, zirconyl nitrate, zirconium oxide and zirconyl hydroxide, and its weight is 1.0 to 430 g, preferably 70 to 350 g, more preferably 100 to 290 g in terms of zirconium oxide per kg of the activated alumina.

The coprecipitated ceria-stabilized zirconia is prepared by the coprecipitation method and its composition is such that the weight ratio of cerium oxide/zirconium oxide is in the range of 1/99 to 25/75, preferably 5/95 to 15/85. The coprecipitated ceria-stabilized zirconia has a specific surface area of 10 to 150 $m^2/g$, preferably 50 to 80 $m^2/g$ and its weight is 10 to 980 g, preferably 50 to 300 g per kg of the activated alumina.

The amount of acetic acid, preferably as an aqueous 60 to 90% by weight solution can be 50 to 300 ml per kg of activated alumina and the amount of deionized water can be 50 to 1,000 ml per kg of active alumina.

It is possible by the milling by the mill to make the slurry with the average particle of 0.1 to 10μ, preferably 1 to 5μ.

The formed slurry is discharged to a vessel and deionized water is added to give slurry 1 having a predetermined specific gravity The specific gravity can, for example, be 1.20 to 1.75 g/ml.

Coating of the Slurry on a Support Having a Monolithic Structure

The above slurry is coated on a support having a monolithic structure. This support is one described in the above "A".

The slurry is made to coat on the support, for example for 1 to 60 seconds, preferably 3 to 10 seconds, and then the excessive slurry in the cell is removed by air blowing. The support on which the slurry was coated is then exposed, for example to hot air, preferably hot air of 20° to 100° C. to remove at least 50% of moisture, preferably 90% of moisture. After removal of the moisture in the above manner, the support can be calcined at a temperature of 200° to 900° C., preferably 300° to 800° C. for 10 minutes to 10 hours, preferably 15 to 60 minutes, for example in air. When the calcination is carried out by gradually raising the temperature of the support, the above drying (removal of moisture) can be omitted.

By the above coating step of the slurry, it is possible to make, for example, 30 to 200 g of the alumina containing platinum and rhodium, 10 to 150 g of cerium oxide, and 1 to 100 g of the coprecipitated ceria-stabilized zirconia ,and optionally 0.1 to 30 g of a zirconium compound in terms of zirconium oxide adhere, per liter of the support having a monolithic structure.

BRIEF DESCRIPTION OF DRAWINGS

FIG. 1 is a drawing showing change in crystal structure between zirconium oxide and the coprecipitated ceria-stabilized zirconia by the X-ray diffraction method.

FIG. 2 is a drawing showing the change of the specific surface area of the coprecipitated ceria-stabilized zirconia as a function of aging temperature.

FIG. 3 is a drawing showing the oxygen storage ability of zirconium oxide, cerium oxide, the coprecipitated ceria-stabilized zirconia , and the impregnated ceria-stabilized zirconia for comparison by the temperature programmed reduction (TPR) measurement method.

BEST MODE FOR CARRYING OUT THE INVENTION

Before examples of the invention are described below, there is described as Reference example 1 a process for preparation of a coprecipitated ceria-stabilized zirconia to be used in the catalyst component-containing layer of the invention,

REFERENCE EXAMPLE 1

The coprecipitated ceria-stabilized zirconia (cerium oxide-stabilized zirconium oxides prepared by the coprecipitation method) to be used in the later-described examples were prepared accordingly to the following process.

900 g of zirconium nitrate in terms of zirconium oxide and 100 g of cerium nitrate in terms of cerium oxide were dissolved in 15 l of deionized water, and the resulting solution was sufficiently stirred and mixed. To this aqueous solution was added dropwise gradually 5 l of 3% by weight aqueous ammonia at room temperature with sufficient stirring. Further, for control of pH between 7 and 8, dropwise addition of aqueous ammonia of the same concentration was continued to form a precipitate.

After formation of the precipitate, the mixture was further stirred for 1 hour and left as it was overnight for aging of the precipitate. This precipitate was suction filtered and washed with 20 l of deionized water, and then this procedure was repeated to obtain a cake. This cake was dried at 110° C. and calcined at 800° C. for 3 hours to obtain a coprecipitated ceria-stabilized zirconia wherein the weight ratio of cerium oxide/zirconium oxide was 10/90.

In the same way were prepared coprecipitated ceria-stabilized zirconia wherein the weight ratios of cerium oxide/zirconium oxide were 5/95, 15/85, 20/80 and 25/75.

The invention is more detailedly described below by examples.

EXAMPLE 1

(a) 1.0 kg of activated alumina having a BET surface area of 150 m$^2$/ g and an average particle size of 30$\mu$ was charged in a mixer, and while the activated alumina was stirring, 300 ml of an aqueous amine solution of hexahydroxoplatinic acid containing 15.5 g of platinum was gradually dropwise added to uniformly disperse it. Then, 150 ml of an aqueous rhodium nitrate solution containing 3.2 g of rhodium was gradually dropwise added to uniformly disperse it.

Finally, 100 ml of 25% by weight acetic acid was gradually dropwise added to be uniformly dispersed it to prepare alumina powder containing platinum and rhodium (Pt/Rh weight ratio: 5/1).

(b) 640 g by dry weight of alumina obtained in the step of (a) and containing platinum and rhodium, 240 g of cerium oxide having an average grain size of 15, 40 g of zirconyl acetate in terms of zirconium oxide, 80 g of the coprecipitated ceria-stabilized zirconia (cerium oxide/zirconium oxide weight ratio: 10/90) prepared in Reference example 1, 71 ml of 90% by weight acetic acid, and 550 ml of deionized water were charged into a mill, and mixed and milled to obtain an alumina slurry. The milling was carried out until 90% or more of particle sizes in the slurry became 9.0$\mu$ or less.

(c) Deionized water was added to the slurry obtained in the step of (b) to adjust the specific gravity to 1.65 g/ml, whereby a diluted slurry was obtained, A cylindrical cordierite-made monolithic carrier having a diameter of 93 mm and a length of 147.5 mmL ( volume 1.0 liter, 400 cells/in$^2$) was dipped in the diluted slurry for 5 seconds, and, after being drawn up from the diluted slurry, and the excessive slurry was removed by air blowing. The resulting carrier was then dried at 30° to 60° C. and calcined at 500° C. for 30 minutes to obtain a catalyst SL-1.

The catalyst SL-1 obtained by the successive steps of (a), (b) and (c) contained per liter of the completed catalyst 1.4 g of platinum and rhodium, 80 g of alumina, 30 g of cerium oxide, 5 g of zirconium oxide, and 10 g of the ceria-stabilized zirconium coprecipitated oxide (cerium oxide/zirconium oxide weight ratio: 10/90).

EXAMPLE 2

The same procedure as in Example 1 was carried out except that in the step of (b) zirconium acetate was not added, whereby a catalyst SL-2 was obtained.

COMPARATIVE EXAMPLE 1

The same procedure as in Example 1 was carried out except that in the step of (b) the coprecipitated ceria-stabilized zirconia was not added, whereby a catalyst SL-3 was obtained.

COMPARATIVE EXAMPLE 2

The same procedure as in Example 1 was carried out except that in the step of (b) the coprecipitated ceria-stabilized zirconia was not added and the addition amount of zirconyl acetate was changed to 120 g in terms of zirconium oxide, whereby a catalyst SL-4 was obtained.

COMPARATIVE EXAMPLE 3

The same procedure as in Example 1 was carried out except that in the step of (b) the coprecipitated ceria-stabilized zirconia and zirconyl acetate were not added, whereby a catalyst SL-5 was obtained.

EXAMPLES 3, 4 AND 5

The same procedure as in Example 1 was carried out except that in the step of (b) the amount of the coprecipitated ceria-stabilized zirconia was changed to 160 g, 240 g and 400 g, whereby catalysts SL-6, SL-7 and SL-8 were obtained, respectively.

REFERENCE EXAMPLE 4

The same procedure as in Example 1 was carried out except that in step of (b) cerium oxide was not added, whereby a catalyst SL-9 was obtained.

EXAMPLE 6

The same procedure as in Example 1 was carried out except that in the step of (b) the weight ratio of cerium oxide/zirconium oxide composing the coprecipitated ceria-stabilized zirconia was changed to 25/75, whereby a catalyst SL-10 was obtained.

TEST EXAMPLE 1

Each of the catalyst (Sample symbols SL-1 to SL-11) obtained in Examples 1 to 7 and Comparative examples 1 to 4 were subjected to the durability test according to the following method and its catalytic performance was evaluated.

Durability Test Conditions

The durability test was carried out by packing each catalyst in a multi-chamber reactor and flowing the engine exhaust gas through the multi-chamber reactor for 50 hours under the following conditions:

| | | |
|---|---|---|
| Driving mode; | Steady state (A/F = 14.6) | 60 seconds |
| | Deceleration (fuel cut, high temperature oxidation atmosphere) | 5 seconds |
| Catalyst inlet temperature; | 850° C. | |
| Fuel; | Gasoline (lead-free) | |

Catalytic Performance Evaluation Conditions

Evaluation of catalytic performance was carried out by packing each catalyst into the same multi-chamber reactor as above equipped with a sampling tube and analyzing the gas components at the upstream and downstream of the catalyst using MEXA 8120 produced by Horiba Seisaku Sho Co., Ltd. Used as the exhaust gas was the same gas as actual exhaust gas. Evaluation of the performance was carried out under the following conditions:

| | |
|---|---|
| Air/fuel ratio; | 14.55, 14.7, 14.85 (A/F = ±0.5) |
| SV; | 133,000/Hr |
| Catalyst inlet temperature: | 400° C. |
| Frequency; | 2.0 Hz |

The purification rate of each component (CO, HC, NOx) was calculated as the average value of the purification rate at each of the above A/F.

The results were shown in Tables 1 and 2.

TABLE 1

| Example | Sample symbol | Amount of the coprecipitated ceria-stabilized zirconia (g/l) | Amount of cerium oxide (g/l) | Amount of zirconyl acetate (in terms of ZrO$_2$) | Purification ratio (%) | | |
|---|---|---|---|---|---|---|---|
| | | | | | CO | HC | NOx |
| Example 1 | SL-1 | 10 | 30 | 5 | 83 | 88 | 68 |
| Example 2 | SL-2 | 10 | 30 | No addition | 82 | 88 | 67 |
| Example 3 | SL-6 | 20 | 30 | 5 | 87 | 91 | 69 |
| Example 4 | SL-7 | 30 | 30 | 5 | 87 | 92 | 70 |
| Example 5 | SL-8 | 50 | 30 | 5 | 85 | 88 | 66 |
| Comparative example 1 | SL-3 | No addition | 30 | 5 | 77 | 86 | 65 |
| Comparative example 2 | SL-4 | No addition | 30 | 15 | 77 | 85 | 66 |
| Comparative example 3 | SL-5 | No addition | 30 | No addition | 76 | 85 | 65 |
| Comparative example 4 | SL-9 | 10 | 0 | 5 | 73 | 80 | 58 |

*1; In each sample results evaluated after the 50 hours durability test at 850° C. are presented.
*2; Each sample is a catalyst wherein the ratio and amount of the platinum group elements are constant and Pt/Rh = 5/1 and 1.4 g/l, and its cell number is constant and 400 cpi$^2$.
*3; Each sample is a catalyst containing 80 g/l activated alumina as a catalyst components other than those described in the table.
*4; The coprecipitated ceria-stabilized zirconia is one prepared by the coprecipitation method and its composition is 90% by weight of zirconium oxide and 10% by weight of cerium oxide.
*5; Purification performance evaluation conditions
Air/fuel ratio; 14.55, 14.70, 14.85 (A/F = ±0.5) SV; 133,000/Hr Catalyst inlet temperature; 400° C. Frequency; 2.0 Hz
Purification ratio (%); Average value of the purification ratio in each of the above air/fuel ratios

TABLE 2

| Example | Sample symbol | Amount of the coprecipitated ceria-stabilized zirconia (g/l) | The weight ratio of cerium oxide/zirconium oxide in the coprecipitated ceria-stabilized zirconia | Purification ratio (%) | | |
|---|---|---|---|---|---|---|
| | | | | CO | HC | NOx |
| Example 1 | SL-1 | 10 | 10/90 | 83 | 88 | 68 |
| Example 6 | SL-10 | 10 | 25/75 | 82 | 86 | 68 |

*1; In each sample results evaluated after the 50 hour durability test at 850° C. are presented.
*2; Each sample is a catalyst wherein the ratio and amount of the platinum group elements are constant and Pt/Rh = 5/1 and 1.4 g/l, and its cell number is constant and 400 cpi².
*3; Each sample is a catalyst containing 80 g/l activated alumina as a catalyst component other than those described in the table.
*4; The coprecipitated ceria-stabilized zirconia is one prepared by the coprecipitation method.
*5; Purification performance evaluation conditions
Air/fuel ratio; 14.55, 14.70, 14.85 (A/F = ±0.5) SV; 133,000/Hr Catalyst inlet temperature; 400° C. Frequency; 2.0 Hz Purification ratio (%); Average value of the purification ratio in each of the above air/fuel ratios As is seen from Table 1, the catalysts (Sample symbols; SL-1, SL-2 SL-6, SL-7 and SL-8) wherein the usual catalyst containing cerium oxide and/or the zirconium compound and the coprecipitated ceria-stabilized zirconia having oxygen storage ability were combined exhibited excellent purification performance even after high temperature aging at 850° C.

Table 2 shows, in each catalyst after high temperature aging at 850° C., the effect of the weight ratio of cerium oxide to zirconium oxide in the coprecipitated ceria-stabilized zirconia on its purification performance.

As is seen from Table 2, the catalyst (SL-1) wherein the weight ratio of cerium oxide to zirconium oxide in the coprecipitated ceria-stabilized zirconia is 10:90 exhibited particularly excellent purification performance.

INDUSTRIAL APPLICABILITY

As is described above, in this invention, purification performance at low temperature after high temperature aging was enhanced by combination of a catalyst containing at least one usual element of the platinum group, activated alumina, cerium oxide and optionally a zirconium compound with a coprecipitated ceria-stabilized zirconia having heat resistance and specific oxygen storage performance. Further, it was found that it is more effective, for enhancement of purification performance at low temperature after high temperature aging, to add this coprecipitated ceria-stabilized zirconia to the outer layer of a catalyst having a structure of at least two catalyst component layers.

By this invention, it became possible to provide a catalyst, when evaluated by purification ratio at low temperature (400° C.) after high temperature aging at 850° C., enhancing the purification ratio of all the regulated substances by 3 to 10%, compared to conventional catalysts.

We claim:

1. An exhaust gas-purifying catalyst containing on a support having a monolithic structure as catalytic components at least one element of the platinum group, activated alumina, cerium oxide and a coprecipitated ceria-stabilized zirconia.

2. The exhaust gas-purifying catalyst of claim 1 wherein the at least one element of the platinum group is platinum or rhodium.

3. The exhaust gas-purifying catalyst of claim 1 or 2 wherein the coprecipitated ceria-stabilized zirconia contains 1 to 25% by weight of cerium oxide and 99 to 75% by weight of zirconium oxide.

4. The exhaust gas-purifying catalyst of claims 1 or 2 wherein the ceria-stabilized zirconium coprecipitated oxide contains 5 to 15% by weight of cerium oxide and 95% to 85% by weight of zirconium oxide.

5. A process for preparation of the exhaust gas-purifying catalyst of claim 1 which comprises the steps of
    (a) preparing activated alumina containing at least one element of the platinum group,
    (b) preparing a slurry containing said prepared platinum group element-containing activated alumina, cerium oxide and a coprecipitated ceria-stabilized zirconia, and
    (c) coating the slurry onto the support having a monolithic structure and calcining the coated monolithic structure.

6. The process for preparation of the exhaust gas-purifying catalyst of claim 5 wherein the at least one element of the platinum group is platinum or rhodium.

7. The process for preparation of the exhaust gas-purifying catalyst of claim 5 or 6 wherein the coprecipitated ceria-stabilized zirconia contains 1 to 25% by weight of cerium oxide and 99 to 75% by weight of zirconium oxide.

8. The process for preparation of the exhaust gas-purifying catalyst of claim 5 or 6 wherein the coprecipitated ceria-stabilized zirconia contains 5 to 15% by weight of cerium oxide and 95 to 85% by weight of zirconium oxide.

9. An exhaust gas-purifying catalyst containing on a support having a monolithic structure as catalytic components at least one element of the platinum group, activated alumina, cerium oxide, a coprecipitated ceria-stabilized zirconia and a zirconium compound.

10. The exhaust gas-purifying catalyst of claim 9 wherein the at least one element of the platinum group is platinum or rhodium.

11. The exhaust gas-purifying catalyst of claim 9 or 10 wherein the coprecipitated ceria-stabilized zirconia contains 1 to 25% by weight of cerium oxide and 99 to 75% by weight of zirconium oxide.

12. The exhaust gas-purifying catalyst of claim 9 or 10 wherein the coprecipitated ceria-stabilized zirconia contains 5 to 15% by weight of cerium oxide and 95 to 85% by weight of zirconium oxide.

13. A process for preparation of the exhaust gas-purifying catalyst of claim 9 which comprises the steps of
    (a) preparing activated alumina containing at least one element of the platinum group,
    (b) preparing a slurry containing said prepared platinum group element-containing activated alumina, cerium oxide, a coprecipitated ceria-stabilized zirconia and a zirconium compound, and
    (c) coating the slurry onto the support having a monolithic structure and calcining the coated monolithic structure.

14. The process for preparation of the exhaust gas-purifying catalyst of claim 13 wherein the at least one element of the platinum group is platinum or rhodium.

15. The process for preparation of the exhaust gas-purifying catalyst of claim 13 or 14 wherein the coprecipitated ceria-stabilized zirconia contains 1 to 25% by weight of cerium oxide and 99 to 75% by weight of zirconium oxide.

16. The process for preparation of the exhaust gas-purifying catalyst of claim 13 or 14 wherein the coprecipitated ceria-stabilized zirconia contains 5 to 15% by weight of cerium oxide and 95 to 85% by weight of zirconium oxide.

* * * * *